Figure 1:
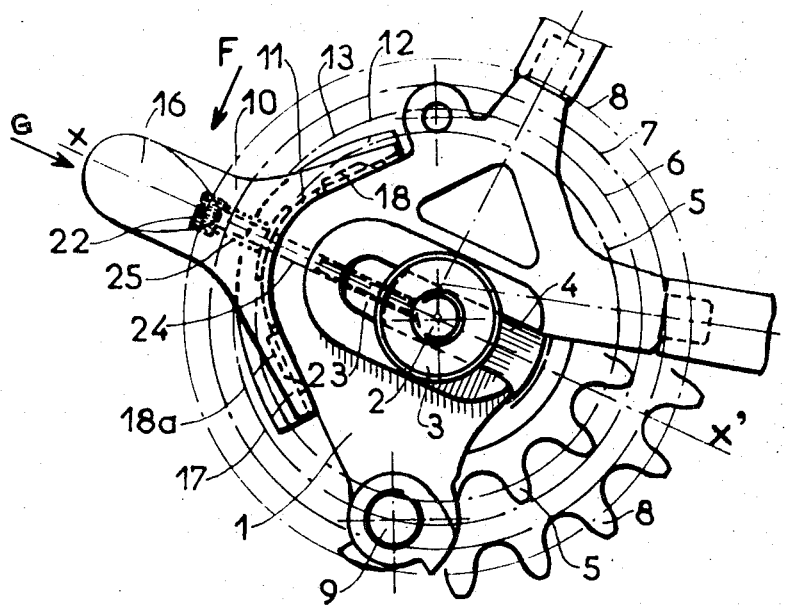

United States Patent [19]
Hautier

[11] 3,840,251
[45] Oct. 8, 1974

[54] DEVICE FOR FACILITATING THE REMOVING OF A CYCLES BACK WHEEL
[76] Inventor: Claude Hautier, 11, Pavillon Chinois St., Nantes, France
[22] Filed: Feb. 15, 1973
[21] Appl. No.: 332,922

[30] Foreign Application Priority Data
Feb. 17, 1972  France.............................. 72.6182

[52] U.S. Cl. .............................. 280/289, 74/217 B
[51] Int. Cl. ...................... B60b 29/00, B62m 9/16
[58] Field of Search ........... 74/217 B; 280/236, 237, 280/238, 288, 289

[56] References Cited
FOREIGN PATENTS OR APPLICATIONS
1,570  1/1896  Great Britain ...................... 280/236

Primary Examiner—David Schonberg
Assistant Examiner—Terrence L. Siemens
Attorney, Agent, or Firm—Bacon & Thomas

[57] ABSTRACT

A device essentially comprising a piece shifting parallel to the axle of the wheel. The piece comprises an edge the profile of which approximately corresponds to the inner trajectory of the chain in its rear part. At the time of the removing of this rear driven wheel the edge is preferably applied against the outer side of the smallest chain-sprocket of the rear drive wheel. By maneuvering the gear-changer, the chain then passes from the middle chain sprocket on to the edge which supports the chain at the time of the removing. Therefore, the removing is done without touching the chain.

5 Claims, 6 Drawing Figures

DEVICE FOR FACILITATING THE REMOVING OF A CYCLES BACK WHEEL

The present invention relates to cycles actuated by a chain passing on the chain-sprocket of the back wheel, referred to herein as a sprocket-and-chain gear changer. More particularly, it relates to the rapid removing of said wheel in spite of said chain's presence.

When reducing the cumbersomeness of a bicycle (or of other cycles) is desired in order to carry it more easily, in a car for instance, one of the best solutions consists in removing the wheels. For the front wheel, there is no particular problem. The rapid unscrewing of the hub axis nuts permits easy removal. For the rear wheel, it is not the same. The chain circuit, especially when the cycle is provided with a gear-changer, is such that it is necessary to take the chain off manually. This not a very easy operation, and is accompanied by moving of the the gear-changer in order to diminish the chain tightening. After sliding the axle of the wheel in its slide-bars used as a bracket, and then taking said wheel off, the greased chain hangs down and becomes cumbersome. To replace the chain on the front chain wheel and on one of the multiple chain-sprockets of the rear wheel, when back in place, as well as on the gear-changer, one should use his hands.

The present invention overcomes these disadvantages. Previously to the removal of the rear wheel, a supplementary piece mounted on the rear part of the frame (for example the chain adjuster of the rear fork corresponding to the transmission chain-sprockets) is set into position in order to support the chain. The latter is then put into a waiting position, after transmitting to it a motion of translation by means of the gear-changer. It is tightened in an almost normal position while disengaging from all the chain sprockets of the rear wheel.

After unscrewing the nuts, the axle of the wheel may then slide freely for complete removal. The hands remain clean, because they have never come into contact with the greased chain. The chain does not hang down anymore. After the removal of the wheel, the frame may be easily placed into trunk of a car, the chain remaining tightened in its normal position between the front chain wheel and the device, which is the subject of this invention.

The replacement of the rear wheel is done easily. After locking up the axle, it is only necessary to make the pedals turn while acting on the gear-changer's handle. The chain leaves its provisional bracket, to replace itself directly on one of the multiple chain-sprockets. The combined maneuver is fast, safe and free from any stains.

The device of the invention essentially comprises a piece movable parallel to the axle of the wheel. The piece comprises an edge the profile of which approximately corresponds to the inner trajectory of the chain in its rear part. At the time of the removing of the rear drive wheel the edge is preferably applied against the outer side of the smallest chain-sprocket of the rear drive wheel. By maneuvering the gear-changer, the chain then passes from the middle chain-sprocket on to the edge of the device which will support said chain at the time of the removing. Therefore, the removing is done without touching the chain.

According to various embodiments, said edge may be applied against the other cogged chain-sprockets apparent.

Other characteristics will become apparent from the following description relating to preferential embodiments, as a non limitative example. The enclosed drawings comprise.

FIG. 1 which is an elevational view of the chain-adjuster of the rear fork with the bracket, object of the invention, the rear wheel being mounted on the said chain-adjuster.

Figure 2:
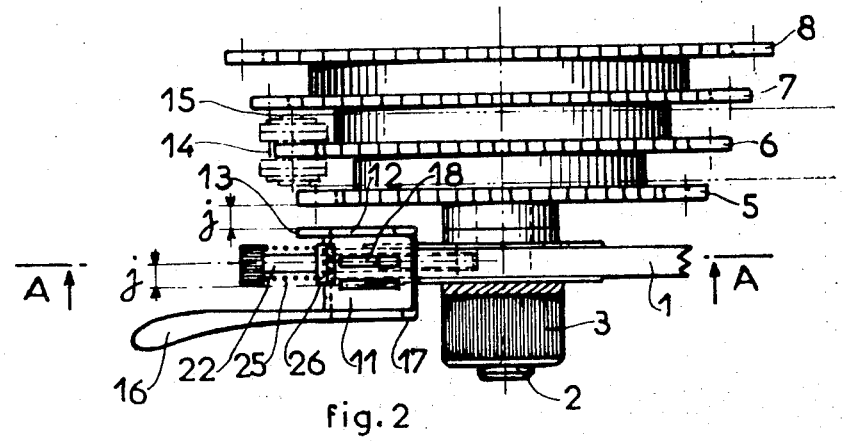

FIG. 2 which is a top view along arrow F of the assembly shown in FIG. 1 — the bracket being in its "out of service" position.

Figure 3:
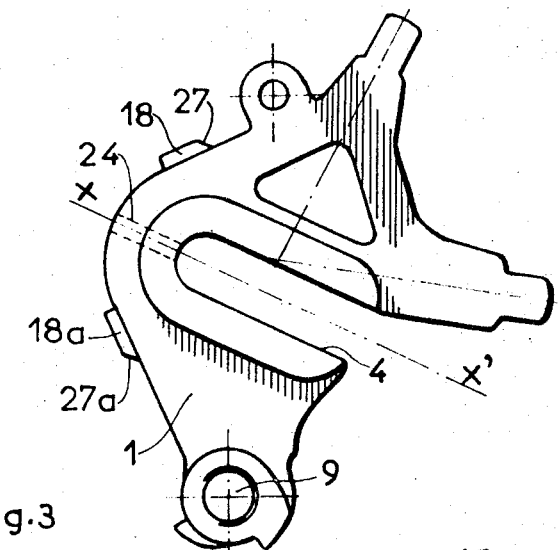

FIG. 3 which is an elevational view of the chain-adjuster of the rear fork with its rib, according to the invention.

Figure 4:
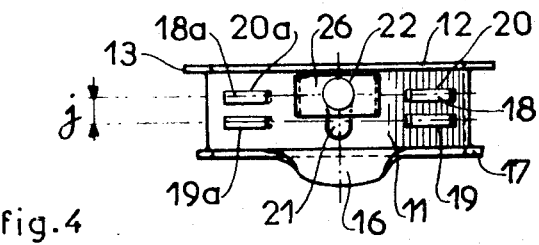

FIG. 4 which is a view along arrow G of FIG. 1 of the bracket, object of the invention.

Figure 5:
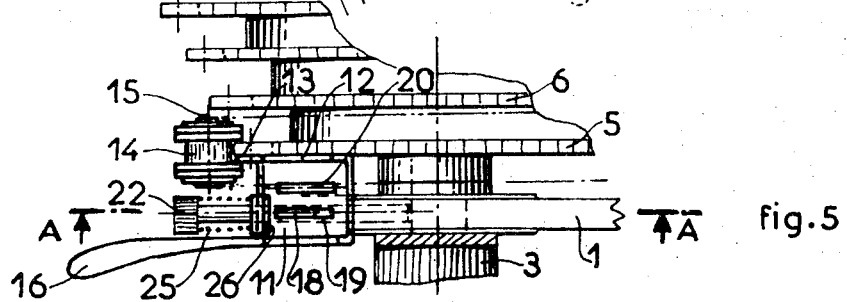

FIG. 5 which is a top view along arrow F of FIG. 1 of the bracket, in an "in service" position.

Figure 6:
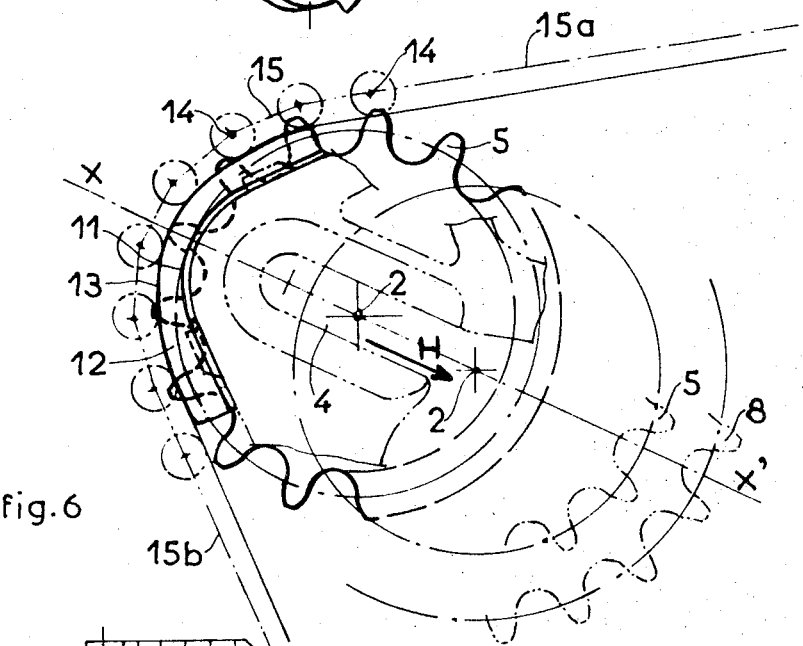

FIG. 6 which is a sectional view along line A—A of FIG. 2 showing the position and the support of the chain at the time of the removing of the wheel.

FIG. 1 represents the back chain-adjuster 1 of the frame on which the axle 2 of the back wheel of a cycle is fixed. After unscrewing the nut 3, said axle 2 may slide into the open incision (or slide-bar) along the direction XX'. The chain-adjuster 1 is obviously the one which corresponds to the staggered chain-sprockets 5, 6, 7, 8, for instance and to the gear-changer support 9.

The bracket 10, object of the invention is mounted on the periphery of the fork chain-adjuster 1, in its back part as shown in FIGS. 1 and 2. Said piece comprises a part 11 following the exact periphery of the chain-adjuster at this spot. A turned up edge 12, or flange perpendicular to the wheels axle extends along an edge 13 whose profile is distinctive. The latter is shown in FIG. 6. It is outwardly of by the top of the cogs of the small chain-sprocket. On both sides of the axis, the profile of the edge 13 roughly follows the trajectories of the lower generatrices of the roller 14 and of the chain 15. The fragment 15a of the chain is the one which extends to the front chain wheel. The fragment 15b is the one which travels through the path determined by the gear-changer hung at 9.

A lug 16 with a stiffener 17 comprises a handle for the bracket 10 and makes its manipulation easy. The handle may have two positions. One (the out of service one) (FIG. 2 and 4), frees the chain-sprocket 5, the flange 12 and its edge 13 being driven outside the plane of 5. The chain freely passes over the small chain-sprocket 5. The other position (FIGS. 5 and 6) puts the flange 12 into contact with the outer vertical side of the small chain-sprocket 5. Each of the positions is determined by a rib-shaped appendage 18, or, in preference, two ribs 18 and 18a (FIG. 3) as appendages in the same plane on the back periphery of the chain-adjuster 1 of the cycle. When there are two ribs, the part 11 of the bracket possesses four slots, 19, 19a, 20, 20a, set out in pairs in the same plane. Both of the appendages enter either slots, respectively 19, 19a or 20, 20a. The distance J between the two series of slots corresponds to the distance between the flange 12 and the outer side of the chain-sprocket 5, when said bracket is out of service. At the center of the part 11 a slot 21 allows the stem 22 of a screw to pass through the part 11, without hindering the motion of translation of said bracket. The stem 22 is screwed through the nut 23, fixed in the slide-bar 4 bearing the axle of the drive back-wheel. Of course, a smooth hole 24 is drilled into the chain-adjuster 1, at this spot in order to guide said screw 22 (FIG. 1 and 3). A spring 25 bearing on the head of screw 22 maintains the part 11 of the bracket supported by the chain-adjuster 1, by means a drilled plate 26 used as a washer. In order to pass from the "out of service" position to the "in service" position, it is only necessary to pull the piece 10 from the appendages 18 and 18a (fitted into the slots 20 and 20a) by pulling the lug 16 along in direction XX'. Then by a motion of translation parallel to the wheel axle, the flange 12 is brought to rest against the chain-sprocket 5. The device is finally latched by letting the spring force said appendages into the slots 19 and 19a. For this purpose, the ends 27 and 27a of the ribs 18 and 18a are chamfered in order not to hinder the freeing of the slots, when the piece 10 is pulled in the direction XX'.

Let us suppose that the device is in an "in service" position (FIG. 5), that is to say, against the chain-sprocket 5. By slightly rotating the chain, the latter is moved by means of the gear-changer, from the chain-sprocket 6 where it had been previously placed, to the vertical plane of the chain-sprocket 5. Then, the chain comes to rest on the edge 13 of the bracket such as is shown in FIGS. 5 and 6.

On the one hand said chain not being engaged between the cogs of the chain-sprocket 5 and on the other hand being supported by the edge 13, it is easy to take off the back wheel by pulling it in the direction XX', along arrow H (FIG. 6).

During the transport of the frame of the cycle, the chain is kept tightened by the gear-changer between the edge 13 and the front chain wheel, without any other manipulation. At the time of reassembling, the drive back-wheel is easily placed back in its operating position. After screwing the nuts 3, it is enough to raise the chain from its position on the edge 13, to the chain-sprocket 6 or to a larger one. This last operation is performed by making the chain rotate and by maneuvering the gear-changer at the same time. Then, the piece 10 is put back in an "out of service" position by maneuvering the lug 16.

The flange 12 may also have a part turned inwardly in order that the edge 13 comes to rest on another chain-sprocket. In this case, the clearance J must be increased.

As appears from the foregoing, the invention does not restrict itself to the above described details. On the contrary, it covers all the possible variants within the scope of the claims. For example, the support of the bracket is generally the back chain-adjuster of the fork. This support may well be directly or indirectly connected to an other part of the frame.

The device according to the invention, is directed to bicycles, tandems etc. . . . as also to pedal fourcycles or tricycles. Said chain-propelled vehicles may or not be include a motor, independent of the device.

I claim:

1. In a cycle having a frame provided with a removable drive wheel having a sprocket-and-chain gear changing means drivingly connected thereto, sprocket wheel means being secured to said drive wheel and removable therewith, the improvement comprising:

a bracket movably mounted on said frame for selective movement toward and from a side of a sprocket wheel of said sprocket wheel means, said bracket having an edge portion of a shape and size corresponding substantially to the outer periphery of said sprocket wheel and positionable closely adjacent said periphery whereby operation of said gear changing means to transfer a drive chain to said sprocket wheel will position said chain on said edge portion, whereupon said drive wheel and sprocket wheel means may be removed from said frame leaving said chain supported by said bracket.

2. A cycle as defined in claim 1 wherein said bracket comprises having a flange perpendicular to the axis of said wheel, the outer edge of said flange being said portion of said shape and size, and a body portion having a surface extending parallel to said axis and movable along a corresponding surface on said frame, and spring means pressing said body portion toward said corresponding surface.

3. A cycle as defined in claim 2 wherein said body portion and said corresponding surface are provided with interengaging means to releasably hold said bracket in two different positions, in one of which said flange is adjacent said sprocket wheel and in the other of which said flange is laterally spaced from said sprocket wheel.

4. A cycle as defined in claim 3 wherein said interengaging means comprise a pair of projections on said corresponding surface and two pairs of openings in said surface of said body portion.

5. A cycle as defined in claim 1 wherein said bracket is provided with handle means to facilitate movement thereof on said frame.

* * * * *